(12) United States Patent
McCormick et al.

(10) Patent No.: US 9,845,901 B2
(45) Date of Patent: Dec. 19, 2017

(54) CAGE APPARATUS HAVING FLUID PASSAGEWAYS TO AFFECT FLOW CHARACTERISTICS OF VALVES

(71) Applicant: Fisher Controls International LLC, Marshalltown, IA (US)

(72) Inventors: Nathan McCormick, Marshalltown, IA (US); Daniel James Eilers, Marshalltown, IA (US); Jason Gene Olberding, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 15/075,889

(22) Filed: Mar. 21, 2016

(65) Prior Publication Data

US 2017/0268697 A1    Sep. 21, 2017

(51) Int. Cl.
*F16K 47/08* (2006.01)
*F16K 1/12* (2006.01)
*F16K 1/54* (2006.01)

(52) U.S. Cl.
CPC ............... *F16K 47/08* (2013.01); *F16K 1/12* (2013.01); *F16K 1/54* (2013.01)

(58) Field of Classification Search
CPC ... F16K 47/08; F16K 1/54; F16K 1/12; Y10T 137/86799; Y10T 137/86734
USPC ................ 251/121, 127; 137/625.3, 625.38; 138/42
See application file for complete search history.

(56) References Cited

U.S. PATENT DOCUMENTS

| | | | | |
|---|---|---|---|---|
| 3,722,854 A | * | 3/1973 | Parola | F16K 47/08 137/625.3 |
| 3,917,221 A | * | 11/1975 | Kubota | F16K 47/08 251/127 |
| 4,077,739 A | * | 3/1978 | Heilenbach | F01D 25/08 60/614 |
| 4,149,563 A | * | 4/1979 | Seger | F16K 3/34 137/625.3 |
| 4,249,574 A | * | 2/1981 | Schnall | F15C 1/02 137/625.3 |

(Continued)

FOREIGN PATENT DOCUMENTS

FR    2187083    1/1974

OTHER PUBLICATIONS

Wikipedia, "De Laval Nozzle", <https://en.wikipedia.org/wiki/De_Laval_nozzle> last retrieved on Feb. 8, 2016 (5 pages).

(Continued)

*Primary Examiner* — John Bastianelli
(74) *Attorney, Agent, or Firm* — Hanley, Flight & Zimmerman, LLC

(57) ABSTRACT

Cage apparatus having fluid passageways to affect flow characteristics of valves are disclosed. An example valve cage includes clustered fluid flow passages. Each fluid flow passage has a first portion connected to a second portion. The first portion tapers towards the second portion and the second portion tapers towards the first portion. The clustered fluid flow passages include a first row and an adjacent second row. The first row and the second row are oriented at a first angle relative an axis of the valve cage to extend along a helically-shaped path on the valve cage.

19 Claims, 7 Drawing Sheets

(56) References Cited

U.S. PATENT DOCUMENTS

| | | | | |
|---|---|---|---|---|
| 4,921,014 | A | * | 5/1990 | Tartaglia ................. F16K 47/08 |
| | | | | 251/127 |
| 5,014,746 | A | * | 5/1991 | Heymann ................ F16K 47/08 |
| | | | | 251/127 |
| 5,419,371 | A | * | 5/1995 | Berchem ................. E21B 43/12 |
| | | | | 138/42 |
| 5,575,618 | A | * | 11/1996 | Brandon ................. F01D 25/00 |
| | | | | 137/549 |
| 6,505,646 | B1 | | 1/2003 | Singleton |
| 2005/0039907 | A1 | | 2/2005 | Madison |
| 2009/0179169 | A1 | | 7/2009 | Fleming |

OTHER PUBLICATIONS

Wikipedia, "Venturi Effect", <https://en.wikipedia.org/wiki/Venturi_effect#Venturi_tubes> last retrieved on Feb. 8, 2016 (6 pages).

Wikipedia, "Choked Flow", <https://en.wikipedia.org/wiki/Choked_flow> last retrieved on Feb. 8, 2016 (7 pages).

Patent Cooperation Treaty, "International Search Report," issued in connection with International Patent Application No. PCT/US2017/022654, dated May 16, 2017, 6 pages.

Patent Cooperation Treaty, "Written Opinion," issued in connection with International Patent Application No. PCT/US2017/022654, dated May 16, 2017, 5 pages.

\* cited by examiner

CAGE APPARATUS HAVING FLUID PASSAGEWAYS TO AFFECT FLOW CHARACTERISTICS OF VALVES

FIELD OF THE DISCLOSURE

This patent relates generally to cage apparatus and, more particularly, to cage apparatus having fluid passageways to affect flow characteristics of valves.

BACKGROUND

Valves are commonly used to control fluid flow in process control systems. Sliding stem valves (e.g., gate valves, globe valves, diaphragm valves, pinch valves, etc.) typically include a closure member (e.g., a valve plug) disposed in a fluid path that controls the fluid flow through the valves. An actuator may be coupled to a stem to move the closure member between an open position and a closed position (e.g., relative to a valve body and/or valve seat) to allow or restrict fluid flow between an inlet and an outlet of the valve. Further, sliding stem valves often include a cage disposed in the fluid path that enables fluid to flow between the inlet and the outlet. In some examples, the cage is disposed in the fluid path such that the cage surrounds the closure member of the valve to align and/or provide stability to the closure member.

SUMMARY

In one example, a valve cage includes clustered fluid flow passages. Each fluid flow passage has a first portion connected to a second portion. The first portion tapers towards the second portion and the second portion tapers towards the first portion. The clustered fluid flow passages include a first row and an adjacent second row. The first row and the second row are oriented at a first angle relative an axis of the valve cage to extend along a helically-shaped path on the valve cage.

In another example, an apparatus includes a valve cage disposed between a bonnet and a valve seat. The valve cage has clustered fluid flow passages extending through a wall of the valve cage between a first surface and an opposing second surface. The clustered fluid flow passages include a first row and an adjacent second row that are helically arranged along the wall of the valve cage at a first angle relative an axis of the valve cage. The apparatus includes a plug slidably disposed in the valve cage. The helically arranged clustered fluid flow passages and the plug are to produce at least one of a linear change in flow capacity and a constant pressure recovery of the valve cage as the plug travels between a closed position and an open position.

In another example, a valve cage includes means for allowing fluid flow through the valve cage disposed on the valve cage in adjacent rows along a helically-shaped path relative to an axis of the valve cage. The means for allowing fluid flow includes means for converging fluid flow and means for diverging converged fluid flow.

BRIEF DESCRIPTION OF THE DRAWINGS

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts.

DETAILED DESCRIPTION

Figure 1A:
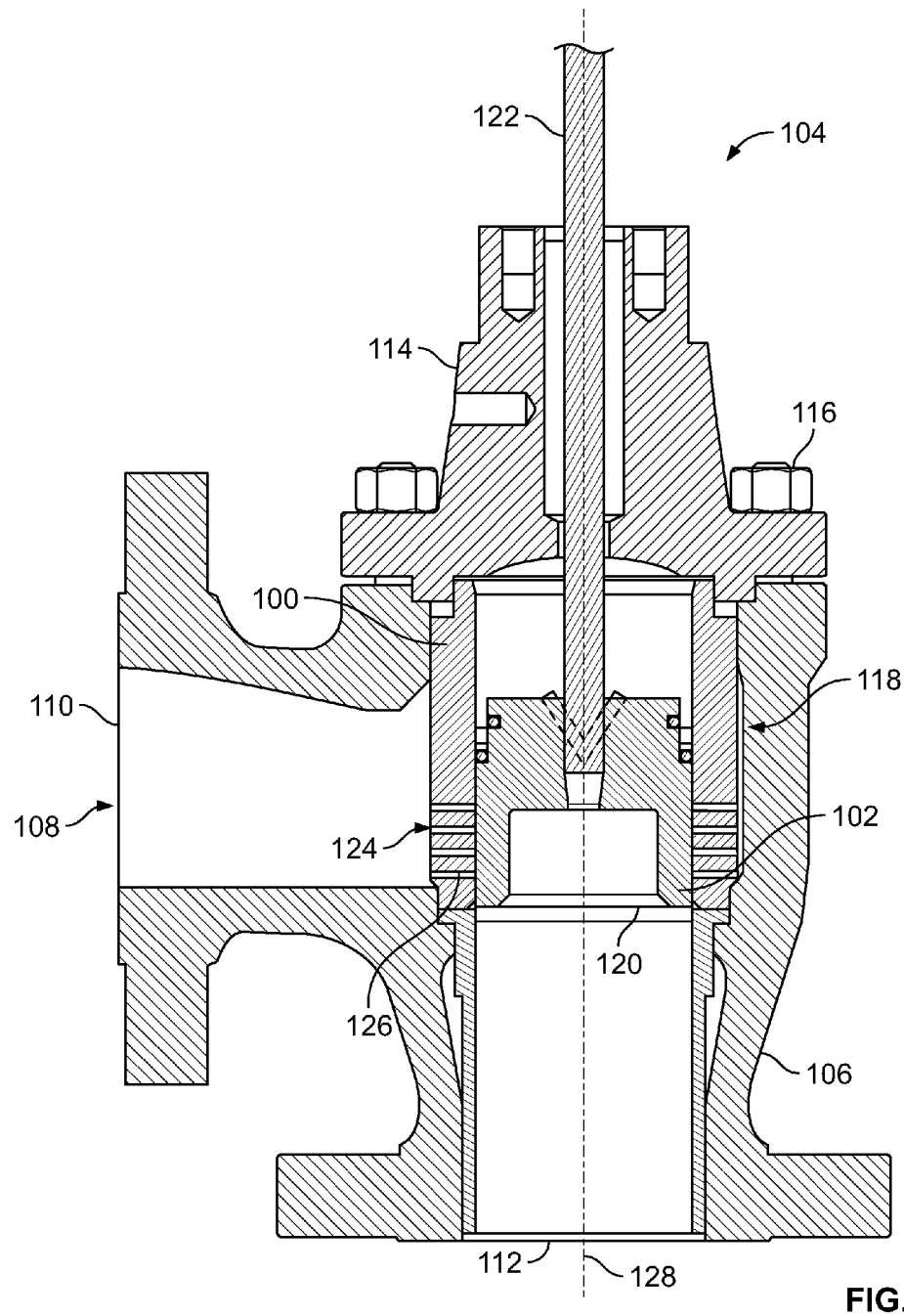
FIG. 1A is a cross-sectional view of a known valve in a closed position.

Many known valves are used to control fluid flow in process control systems. Some known valves are sliding stem valves (e.g., gate valves, globe valves, diaphragm valves, pinch valves, etc.) in which a closure member (e.g., a valve plug) is disposed in a fluid path to control a fluid flow through the valve. For example, these valves include a valve stem that is operatively coupled to the closure member and an actuator. The actuator moves the valve stem to move the closure member between a closed position and an open position to allow and/or restrict fluid flow between an inlet and an outlet of the valve. For example, the closure member may engage a valve seat and/or a surface of a valve body when the valve is in the closed position to prevent fluid flow and may be spaced apart from the valve seat and/or the surface of the valve body when the valve is in a partially-open position and/or a fully-open position to enable fluid flow.

Some known valves include a cage disposed in the fluid path between the inlet and the outlet that defines fluid passageways to enable fluid to flow through the valve. In some examples, the closure member is disposed in an opening defined by the cage as the closure member transitions between the closed position and the open position. To control the fluid flow through the valve, an outer surface of the plug engages and/or is adjacent an inner surface of the cage to open, partially open and/or close the fluid passageways of the cage as the plug moves between the closed position and the open position. In some examples, characteristics of the fluid passageways (e.g., shape, size, cross-section, profile, position, orientation, etc.) of the cage affect flow characteristics of the fluid (e.g., flow capacity, noise attenuation, cavitation, pressure recovery, etc.) flowing through the fluid passageways.

For example, some known valve cages include fluid passageways that produce low pressure recovery. Pressure recovery is a flow characteristic of a fluid passageway that indicates an amount and/or percentage of increase in fluid pressure after a preceding decrease in fluid pressure. For example, if a fluid passageway includes a throat (e.g., a narrowed portion of the fluid passageway between two wider portions of the fluid passageway), the fluid pressure decreases as the fluid approaches the throat and subsequently increases as the fluid exits the throat. In such instances, the pressure recovery identifies the increase in fluid pressure from the throat (e.g., the lowest pressure value) to the subsequent wider portion (e.g., the highest pressure value downstream from the throat). In examples in which the valve cage produces a low pressure recovery, the fluid pressure downstream from the throat may be significantly less than the fluid pressure upstream from the throat. Low pressure recoveries and/or reduced fluid pressure may result in other undesired fluid flow characteristics such as, for example, cavitation and/or reduced noise attenuation. Further, valve cages that produce low pressure recoveries may increase dependency on downstream pressure conditions and/or may require a flow meter to produce consistent flow metering.

Some known valve cages include fluid passageways that produce a non-continuous and/or otherwise unpredictable non-linear rate of change of flow capacity as the corresponding closure member transitions from the closed position to the open position and/or from the open position to the closed position. Flow capacity (e.g., volumetric flow rate, rate of fluid flow) is a flow characteristic indicating an amount (e.g., volume) of fluid which passes per unit in time. For example, the flow capacity may increase with an increase in cross-sectional area of a flow path. Thus, a flow capacity of a valve cage increases as more fluid passageways of the valve cage are opened to enable fluid to flow through those fluid passageways.

Additionally or alternatively, the fluid passageways of some known cages produce a non-continuous and/or otherwise unpredictable rate of flow capacity change (e.g., a stepped, stages and/or incremental rate of change), for example, in which the rate of flow capacity change cycles between remaining constant and deceasing and/or increasing as the closure member transitions between the closed position and the open position. Additionally or alternatively, the fluid passageways of such valve cages may produce a non-constant and/or inconsistent (e.g., staged, incremental, cyclical, etc.) pressure recovery of the cage as the plug transitions between the closed position and the open position. The non-continuous flow capacity rate of change and/or the non-constant pressure recovery may increase a difficulty of positioning the plug of the valve to control a downstream fluid flow (e.g., the correlation between the position of the plug and the downstream fluid flow is unpredictable). As a result, such known cages having non-continuous flow characteristics may produce unstable or cyclical fluid flow control and/or may require a downstream flow meter to accurately control the fluid flow.

The example apparatus disclosed herein include a valve having a valve cage that increases a pressure recovery, produces a constant pressure recovery and/or produces a linear and/or otherwise predictable change in flow capacity as a closure member (e.g., a valve plug) adjacent the valve cage transitions between a closed position and a fully-open position. For example, the valve cage of the example apparatus includes fluid flow passages that are shaped to increase the pressure recovery produced by the valve cage as fluid flows from an inlet to an outlet of the valve. Further, the fluid flow passages are arranged along a helically-shaped path of the valve cage such that a plurality of the fluid flow passages is partially exposed when the closure member is at any partially-open position. Thus, the helically-arranged fluid flow passages of the valve cage produce a constant pressure recovery and/or a predictable (e.g., linear, exponential, etc.) rate of change of flow capacity as the closure member transitions between the closed position and the fully-open position.

An example apparatus disclosed herein includes a valve cage that is to be disposed in a passageway of a valve between a bonnet and a valve seat to affect characteristics of fluid (e.g., an increased pressure recovery, a constant pressure recovery, a linear or otherwise predictable rate of change of flow capacity) flowing through the passageway. A closure member (e.g., a valve plug) is slidably disposed in an aperture formed by the valve cage. The closure member controls the fluid flow of the valve by transitioning between a closed position (e.g., at which the closure member prevents fluid flow through the valve) and a fully-open position (e.g., at which the closure member enables full-capacity fluid flow through the valve) within the aperture of the valve cage.

The example valve cage includes clustered fluid flow passages extending through a wall between a first surface (e.g., an inner surface) and an opposing second surface (e.g., an outer surface) of the valve cage to enable fluid flowing through the fluid passageway of the valve to flow through the valve cage. Each of the fluid flow passages includes a first portion and a second portion adjacent and fluidly coupled to the first portion. The first portion of each fluid flow passage tapers from the first surface of the valve cage toward the corresponding second portion and connects to the second portion via a throat, and the second portion of each fluid flow passage tapers from the second surface of the valve cage toward the corresponding first portion and connects to the first portion via the throat. For example, the first portion has a first cross-sectional area, the second portion has a second cross-sectional area, and the throat has a third cross-sectional area smaller than the first cross-sectional area and the second cross-sectional area. In some examples, the cross-sections of the first portion, the second portion, and the throat are circular, ovular, or polygonal.

The shapes of the respective clustered fluid flow passages of the example valve cage affect characteristics of the fluid (e.g., pressure recovery, rate of change of flow capacity, etc.) flowing through fluid passageway of the valve. In some examples, the first portion of each of the fluid flow passages has an arcuate taper adjacent the first surface of the valve cage that increases a pressure recovery produced by each of the fluid flow passages. Additionally or alternatively, the second portion of each of the fluid flow passages includes a linear taper between the second surface of the valve cage and the first surface (e.g., at an angle of about between 2 to 4 degrees) that increases a pressure recovery produced by each of the fluid flow passages. Further, in some examples, the first portion of each of the fluid flow passages has a first length and the corresponding second portion has a second length greater than the first length (e.g., the throat is closer to the first surface than the second surface) that affect the pressure recovery produced by the fluid flow passages.

Additionally or alternatively, an orientation or positioning of the cluster of fluid flow passages on the example valve cage affects characteristics of the fluid (e.g., pressure recovery, rate of change of flow capacity, etc.) flowing through fluid passageway of the valve. For example, the cluster of fluid flow passages includes rows of fluid flow passages (e.g., a first row of fluid flow passages, an adjacent second row of fluid flow passages, etc.) that are oriented at an angle (e.g., a first angle) relative an axis of the valve cage to extend along a helically-shaped path on the valve cage.

In some examples, the rows of the clustered fluid flow passages are oriented at an angle (e.g., a second angle less than the first angle) relative to the axis of the valve cage so that a first portion of one of the fluid flow passages of a first row and a second portion (e.g., different than the first portion) of one of the fluid flow passages of an adjacent second row are exposed by the adjacent closure member. That is, the clustered fluid passages are oriented at the second angle such that different portions of different adjacent fluid flow passages are exposed (e.g., fully covered, about less-than-halfway exposed, about halfway exposed, about more-than-halfway exposed, fully exposed) by the adjacent closure member. In some examples, more than one of the fluid flow passages of a row (e.g., the first row, the second row, etc.) are partially exposed (e.g., neither fully covered nor fully exposed) by the closure member. As a result of the adjacent fluid flow passages being exposed simultaneously by varying degrees at each of the partially-open positions of the closure member, the helically-shaped path of the clustered fluid flow passages of the valve cage produce a linear and/or otherwise predictable (e.g., exponential) rate of flow capacity change and/or a constant pressure recovery as the closure member transitions between the closed position and the fully-open position.

Figure 1B:
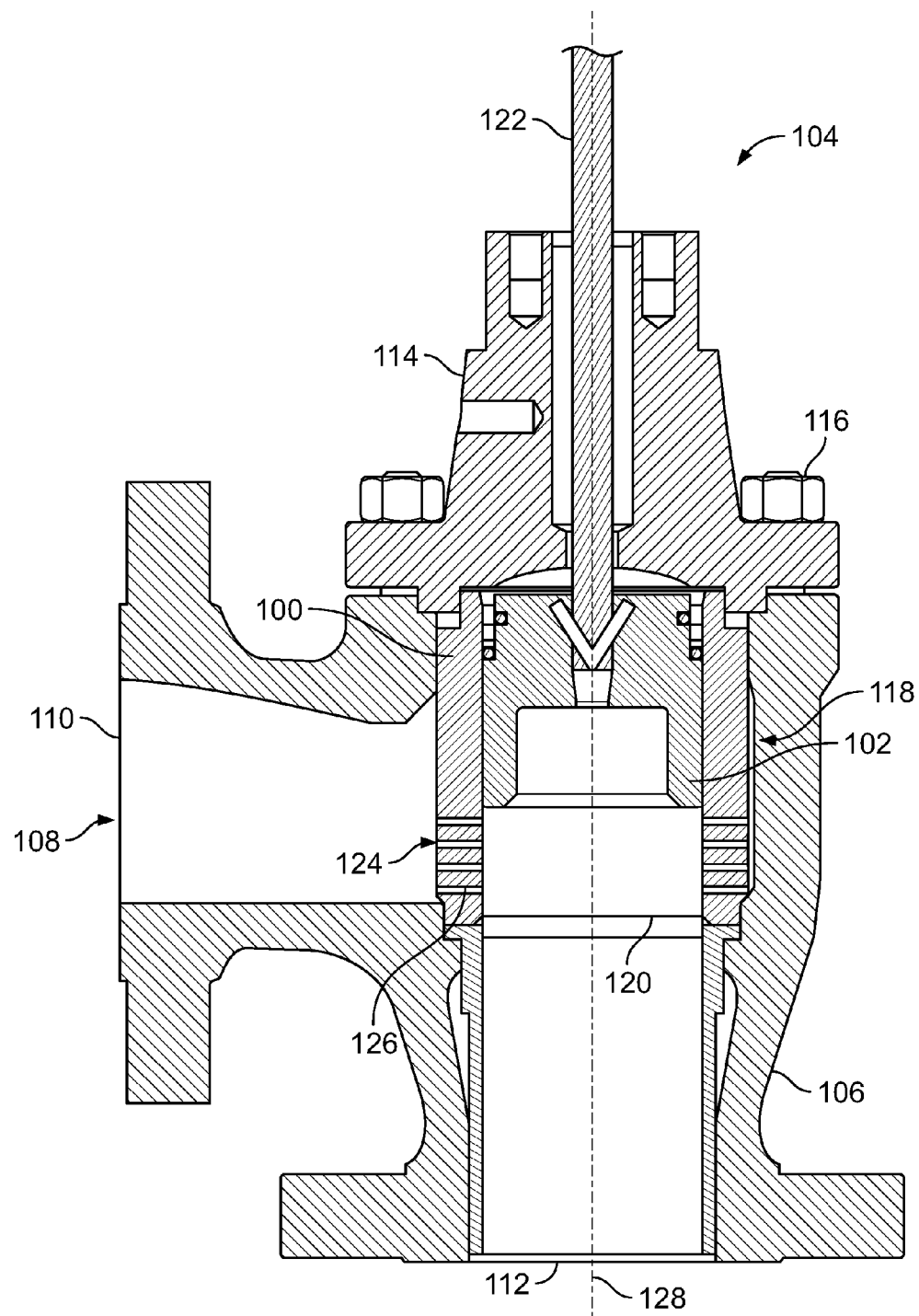
FIG. 1B is a cross-sectional view of the known valve of FIG. 1A in an open position.

Before discussing the example valve cages disclosed herein, a brief description of a known valve cage 100 is provided in FIGS. 1A and 1B. More specifically, FIG. 1A shows the known valve cage 100 and a corresponding valve plug 102 in a closed position, and FIG. 1B shows the known valve cage 100 and the corresponding valve plug 102 in a fully-open position.

As illustrated in FIGS. 1A and 1B, a known valve 104 includes a valve body 106 that defines a fluid flow passageway 108 between an inlet 110 and an outlet 112. A bonnet 114 is coupled to the valve body 106 via fasteners 116. A valve trim assembly 118 disposed within the fluid flow passageway 108 controls the flow of fluid between the inlet 110 and the outlet 112. The valve trim assembly 118 includes the valve cage 100, the valve plug 102 (e.g., a closure member), a valve seat 120, and a stem 122.

The valve cage 100 defines fluid flow passageways 124 that enable fluid to flow through the valve cage 100 and, thus, the fluid flow passageway 108 of the valve body 106 when the valve plug 102 is in the fully-open position and/or a partially-open position. As illustrated in FIGS. 1A and 1B the fluid flow passageways 124 of the known valve cage 100 have a rectangular cross-section (i.e., a constant cross-sectional area along the length of the passageway). In some instances, the shape of the fluid flow passageways 124 causes fluid flowing through the fluid flow passageways 124 to separate from internal walls 126 of the valve cage 100 defining the respective fluid flow passageways 124, thereby reducing a pressure recovery of the fluid flowing through the fluid flow passageways 124.

As illustrated in FIGS. 1A and 1B, the valve plug 102 of the valve 104 closely fits within the known cage 100 so that the valve plug 102 is slidable within the cage 100. The stem 122 of the valve 104 operatively couples the valve plug 102 to an actuator stem (not shown) which, in turn, couples the valve plug 102 to an actuator (not shown). In operation, the actuator (e.g., a pneumatic actuator) drives the stem 122 and, thus, the valve plug 102 between the closed position of FIG. 1A and the fully-open position of FIG. 1B. In the closed position, the valve plug 102 is in sealing engagement with the valve seat 120 (e.g., a seat ring) to prevent and/or substantially restrict the flow of fluid through the valve 104. In the fully-open position, the valve plug 102 is spaced apart from the valve seat 120 to enable the fluid flow passageways 124 of the valve cage 100 to allow fluid to flow through fluid flow passageway 108 of the valve 100 at a maximum flow rate.

As illustrated in FIGS. 1A and 1B, the fluid flow passageways 124 of the known valve cage 100 are stacked in rows perpendicular to a longitudinal axis 128 of the valve plug 102. Thus, as the valve plug 102 transitions from the closed position of FIG. 1A toward the open position of FIG. 1B, the valve plug 102 initially exposes no row of the fluid flow passageways 124 and then subsequently partially exposes each of the fluid flow passageways 124 of a first row, fully exposes each of the fluid flow passageways 124 of the first row, exposes a wall of the valve plug 102 between the first row and a second row of the fluid flow passageways, partially exposes each of the fluid flow passageways 124 of the second row, etc. Thus, the valve plug 102 cycles between exposing no additional row of the fluid flow passageways 124, partially exposing each of the fluid flow passageways 124 in an additional row (e.g., the valve plug 102 exposes the same portion of each of the fluid flow passageways 124 of the adjacent row), and fully exposing each of the fluid flow passageways 124 in an additional row. As a result, the flow capacity remains constant when none of the fluid passageways 124 are exposed, increases when a first row of the fluid passageways 124 is exposed, again remains constant when no additional rows of the fluid passageways 124 are exposed, further increases when a second row of the fluid passageways 124 is partially exposed, etc. In other words, the known valve cage 100 produces a non-linear (e.g., stepped) rate of change (e.g., an increase and/or a decrease) of flow capacity as the valve plug 102 transitions between the closed position and the open position. Further, the positioning of the fluid flow passageways 124 of the known valve cage 100 may result in a non-constant and/or inconsistent (e.g., staged, incremental and/or cyclical) pressure recovery of the fluid flowing through the fluid flow passageway 110 as the valve plug 102 transitions between the closed position and the fully-open position.

Figure 2:
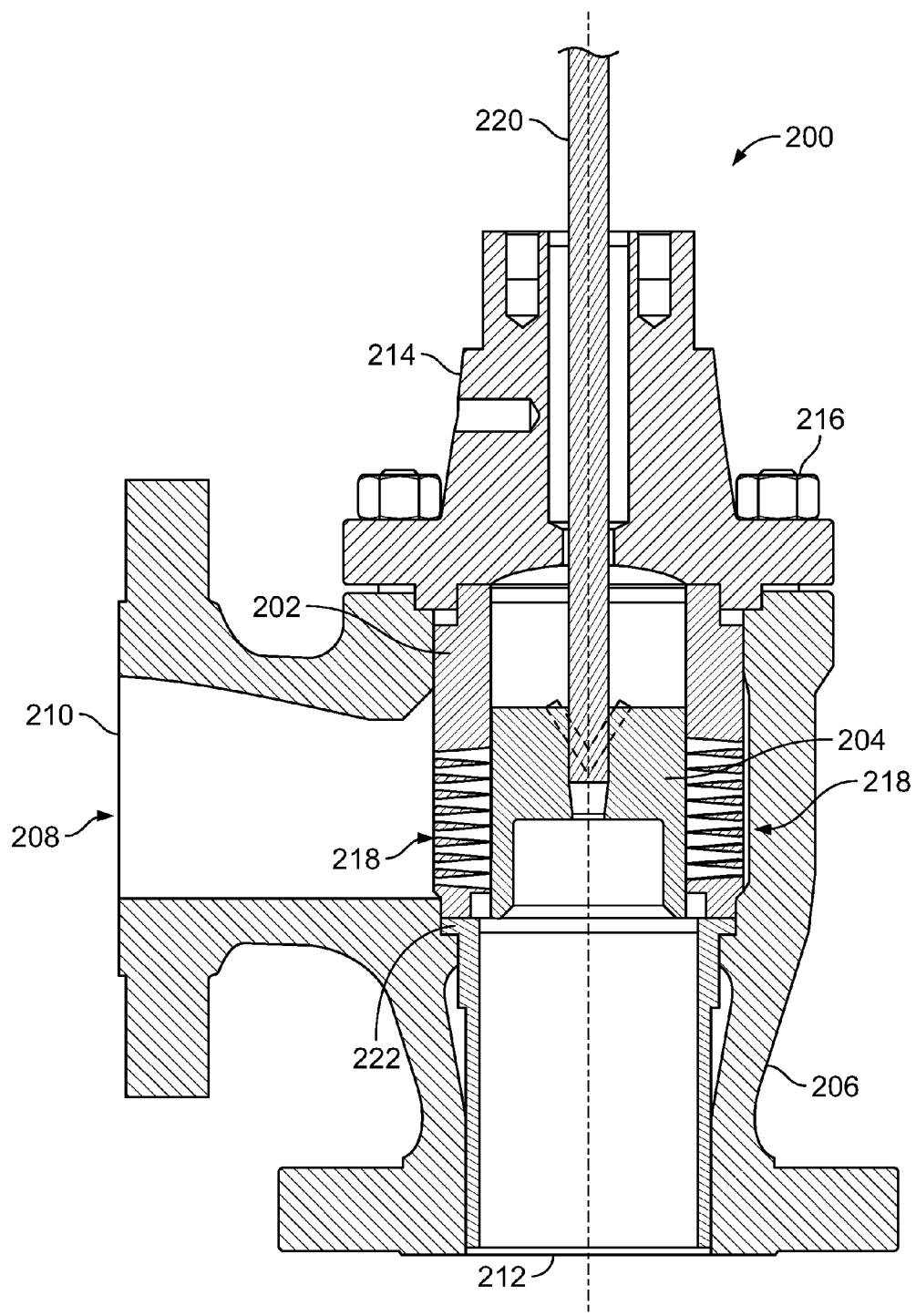
FIG. 2 is a cross-sectional view of a valve having a valve cage in accordance with the teachings herein.

FIG. 2 is a cross-sectional view of an example valve 200 that includes a valve cage 202 in accordance with the teachings herein. More specifically, FIG. 2 shows a closure member 204 (e.g., a valve plug) of the valve 200 in a closed position. The valve 200 includes a valve body 206 that defines a fluid flow passageway 208 between an inlet 210 and an outlet 212. A bonnet 214 is coupled to the valve body 206 via fasteners 216.

The example valve cage 202 is disposed in the fluid flow passageway 208 between the inlet 210 and the outlet 212 to control the fluid flow of the valve 200. In the illustrated example, the valve cage 202 is a unitary structure. In other examples, the valve cage 202 may be two-piece cage that includes, for example, an upper portion and a lower portion removably coupled to the upper portion. As illustrated in FIG. 2, the valve cage 202 defines fluid flow passages 218 that enable fluid to flow through the valve cage 202 when the closure member 204 is in an open position. The fluid flow passages 218 affect characteristics of the fluid (e.g., increase pressure recovery, produce a constant pressure recovery, produce a linear and/or otherwise predictable rate of change of flow capacity, etc.) flowing through the valve cage 202 between the inlet 210 and the outlet 212 of the fluid flow passageway 208.

As illustrated in FIG. 2, the closure member 204 is sized to fit closely within the valve cage 202 to enable the valve plug 204 to slide within the valve cage 202. A stem 220 of the valve 200 operatively couples the closure member 202 to an actuator stem (not shown) which, in turn, couples the closure member 204 to an actuator (not shown). In operation, the actuator (e.g., a pneumatic actuator) drives the stem 220 and, thus, the closure member 204 between the closed position of FIG. 2 and a fully-open position in which fluid flows through the fluid flow passages 218 of the valve cage 202. When the closure member 204 is in the closed position as illustrated in FIG. 2, the closure member 204 is in sealing engagement with a valve seat 222 (e.g., a seat ring) of the valve body 206 to prevent and/or substantially restrict fluid from flowing through the valve 200. In contrast, when the closure member 204 is in the fully-open position, the closure member 204 is spaced apart from the valve seat 222 and the fluid flow passages 218 of the valve cage 202 to enable fluid to flow freely (e.g., at a maximum flow rate) through fluid flow passageway 208 of the valve 200.

Figure 3:
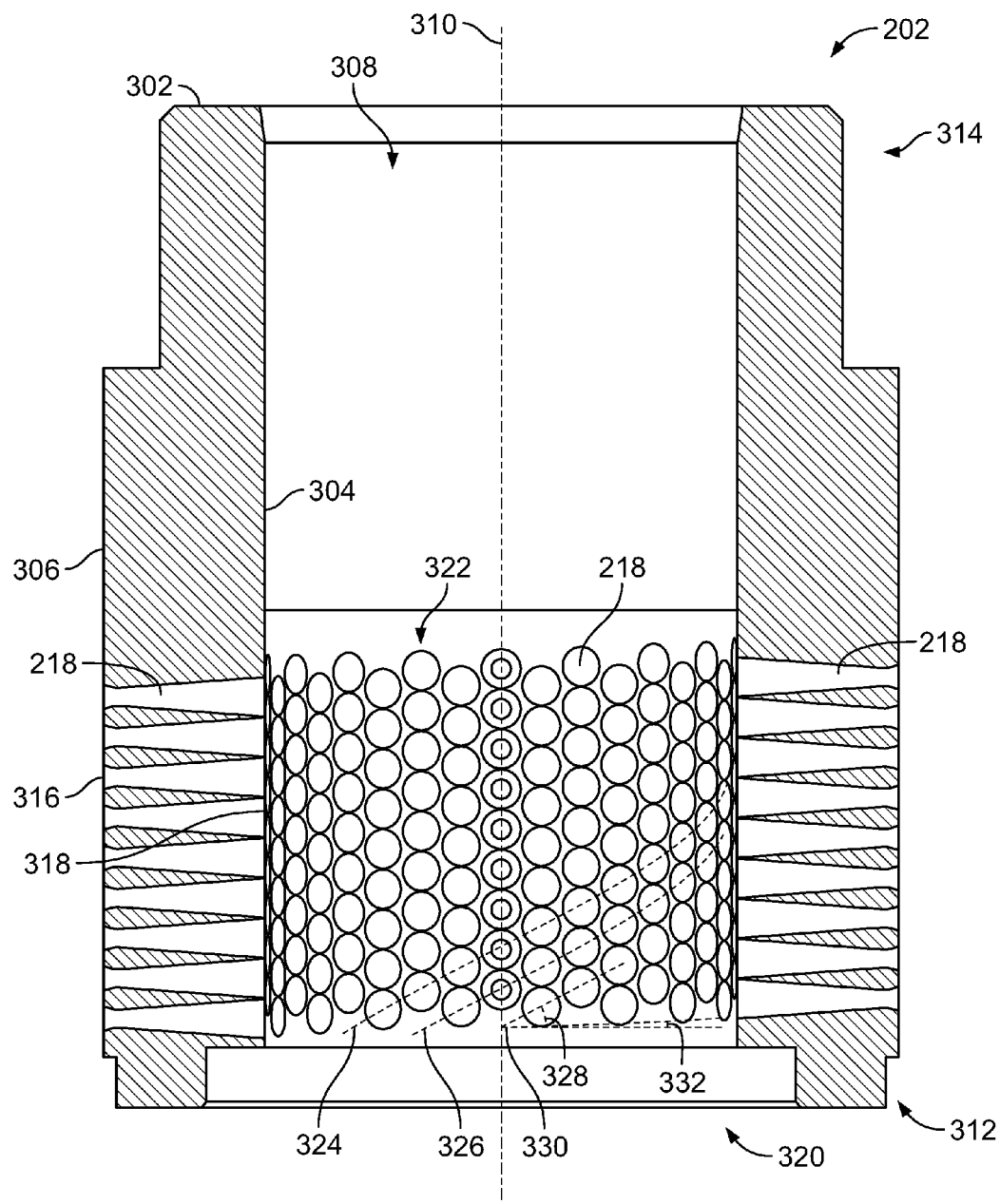
FIG. 3 is a cross-sectional view of the valve cage of FIG. 2 in accordance with the teachings disclosed herein.

FIG. 3 is a cross-sectional view of the example valve cage 202 in accordance with the teachings disclosed herein. In the illustrated example, the valve cage 202 includes a cage wall 302 that defines an inner surface 304 (e.g., a first surface) and an opposing outer surface 306 (e.g., a second surface). The inner surface 304 of the valve cage 202 defines an aperture 308 that is to receive the closure member 204 (FIG. 2). The aperture 308 of the illustrated example is cylindrically shaped and extends along a center axis 310 of the valve cage 202 to enable the closure member 204 to transition between a closed position and a fully-open position to control the fluid flow of the valve 200 (FIG. 2).

In the illustrated example, the fluid flow passages 218 are disposed on a first portion 312 (e.g., a lower half) of the valve cage 202. Additionally or alternatively, the fluid flow passages 218 may be disposed on a second portion 314 (e.g., an upper portion) of the valve cage 202 adjacent the first portion 312. As illustrated in FIG. 3, the fluid flow passages 218 extend between the inner surface 304 and the outer surface 306 of the cage wall 302. In the illustrated example, the outer surface 306 of the cage wall 302 defines an inlet 316 of each of the fluid flow passages 218, and the inner surface 304 defines an outlet 318 of each of the fluid flow passages 218. When fluid flows from the inlet 210 (FIG. 2) of the fluid flow passageway 208 (FIG. 2) of the valve 200 to the corresponding outlet 212 (FIG. 2), fluid flows from the inlets 316 of the fluid flow passages 218, to the corresponding outlets 318 of the fluid flow passages 218, and subsequently through an outlet 320 of the valve cage 202. As disclosed below in further detail, the contours of the fluid flow passages 218 affect fluid flow characteristics (e.g., pressure recovery, flow capacity, etc.) of the fluid flowing through the valve cage 202.

In the illustrated example, the fluid flow passages 218 of the valve cage 202 form a cluster 322 that includes rows 324, 326 of the fluid flow passages 218. For example, the cluster 322 includes the row 324 (e.g., a first row) and the row 326 (e.g., a second row) adjacent the row 324. The cluster 322 of the fluid flow passages 218 are oriented relative to the axis 310 of the valve cage 202 to extend along a helically-shaped path. For example, the rows 324, 326 extend diagonally along the cage wall 302 (e.g., upward and to the right in the illustrated example) at an angle 328 relative to a plane 330 perpendicular to the axis 310 of the valve cage 202. Further, the cluster 322 of the fluid flow passages 218 as a whole extend along a helically-shaped path at an angle 332 relative to the plane 330 perpendicular to the axis 310 of the valve cage 202. In the illustrated example, the angle 332 is less than the angle 328. As disclosed below in further detail, the angles 328, 332 at which the fluid flow passages 218 are oriented to improve fluid flow characteristics (e.g., pressure recovery, flow capacity, etc.) of the fluid flowing through the valve cage 202.

Figure 4B:
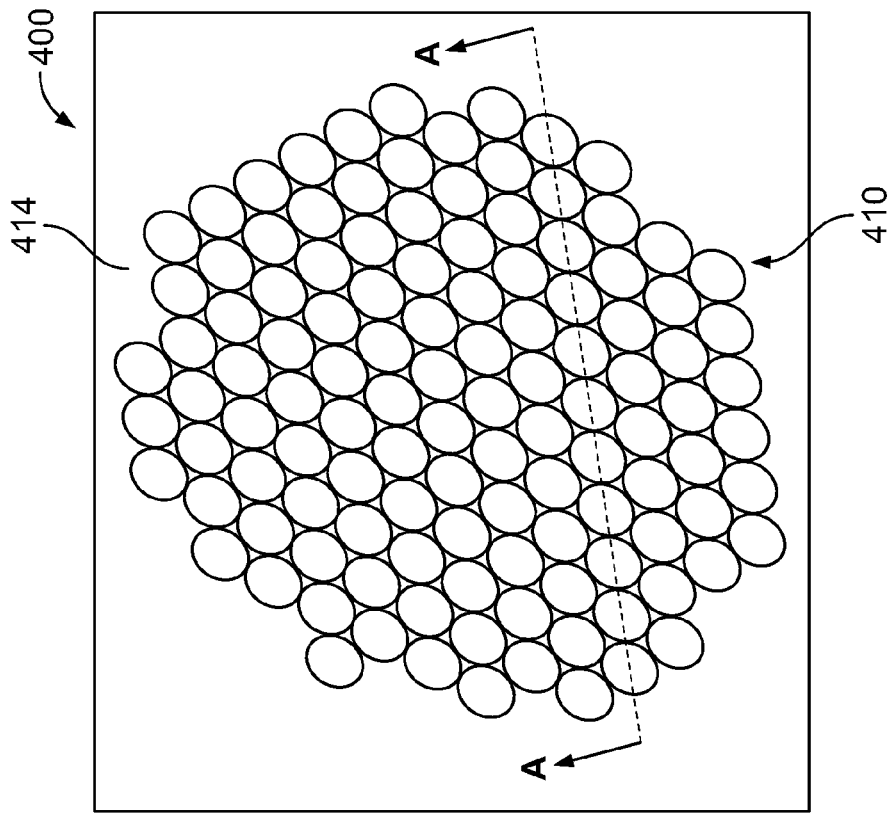
FIG. 4B shows an opposing second side of the fluid flow passages of FIG. 3A of the valve cage of FIGS. 2 and 3.
Figure 4A:
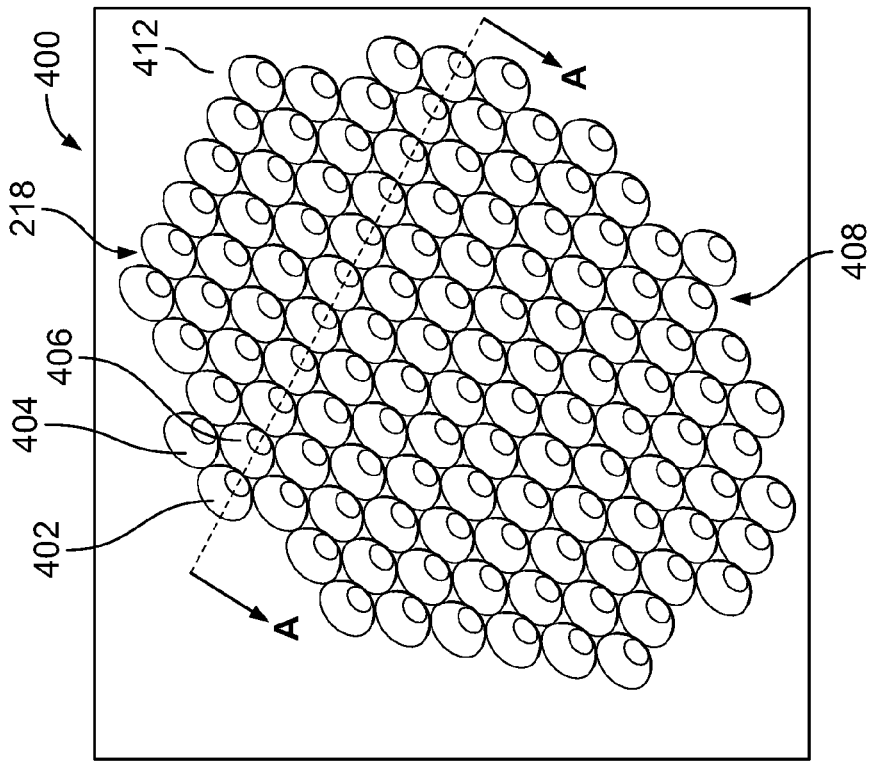
FIG. 4A shows a first side of fluid flow passages of the valve cage of FIGS. 2 and 3.

FIGS. 4A and 4B illustrate a grouping 400 of the fluid flow passages 218 distributed along a plane. The grouping 400 of the illustrated example includes a fluid flow passage 402 (e.g., a first fluid flow passage), another fluid flow passage 404 (e.g., a second fluid flow passage) adjacent the fluid flow passage 402, and another fluid flow passage 406 (e.g., a third fluid flow passage) adjacent the fluid flow passages 402, 404. In the illustrated example, each of the fluid flow passages 218 of the grouping 400 have a circular cross-section. In other examples, one or more of the fluid flow passages 218 has an ovular, polygonal (e.g., rectangular, pentagonal, hexagonal, etc.) and/or any other shaped cross-section. The fluid flow passages 218 of the illustrated example extend between a first side 408 (FIG. 4A) and an opposing second side 410 (FIG. 4B). The first side 408 of the fluid flow passages 218 is defined by a first surface 412 (FIG. 4A), and the second side 410 is defined by an opposing second surface 414 (FIG. 4B).

In FIGS. 4A and 4B, the first surface 412 of FIG. 4A represents the cylindrical outer surface 306 (FIGS. 2 and 3) of the valve cage 202, and the second surface 414 represents the cylindrical inner surface 304 (FIGS. 2 and 3). Thus, returning to FIG. 3, the outer surface 306 of the valve cage 202 defines the first side 408 of the fluid flow passages 218, and the opposing inner surface 304 defines the second side 410 of the fluid flow passages 218. In other examples, the inner surface 304 of the cage wall 302 defines the first side 408 of the fluid flow passages 218, and the opposing second side 410 of cage wall 302 defines the second side 410 of the fluid flow passages 218.

Figure 5:
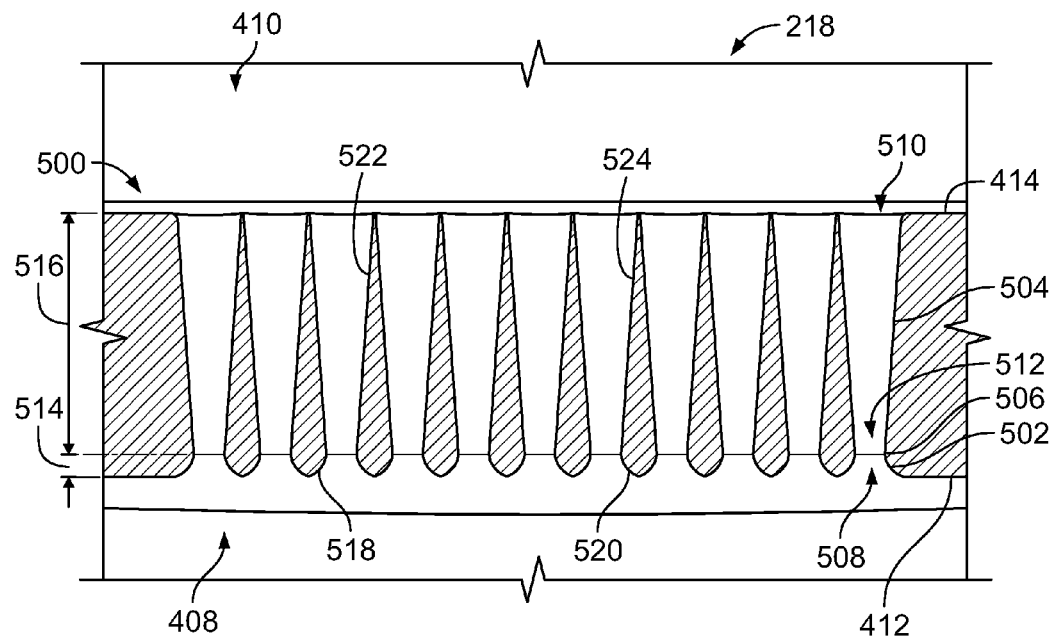
FIG. 5 is a cross-sectional view of the fluid flow passages of FIGS. 4A and 4B taken along line A-A of FIGS. 4A and 4B.

FIG. 5 is a cross-sectional view of a row 500 of the fluid flow passages 218 taken along line A-A of FIGS. 4A and 4B. As illustrated in FIG. 5, each of the fluid flow passages 218 includes a first portion 502, a second portion 504, and a throat 506 between the first portion 502 and the second portion 504. The first portion 502 defines the first side 408 of each of the fluid flow passages 218 and extends between the first surface 412 and the throat 506. The second portion 504 defines the second side 410 of each of the fluid flow passages 218 and extends between the second surface 414 and the throat 506. Thus, the throat 506 of each of the fluid flow passages 218 is disposed between and connects the corresponding first and second portions 502, 504.

As illustrated in FIG. 5, the first and second portions 502, 504 of each of the fluid flow passages 218 are tapered such that the first portion 502 tapers from the first surface 412 to the throat 506 and the second portion 504 tapers from the second surface 414 to the throat 506. For example, the first portion 502 defines a first cross-sectional area 508, the second portion 504 defines a second cross-sectional area 510, and the throat 506 defines a third cross-sectional area 512 that is smaller than the first and second cross-sectional areas 508, 510. In the illustrated example, the first portion 502 has a first length 514 and the second portion 504 has a second length 516 greater than the first length 514. As a result, the throat 506 of the illustrated example is closer to the first surface 412 than to the second surface 414. The position of the example throat 506 relative to the first surface 412 and the second surface 414 improves fluid flow characteristics (e.g., pressure recovery, flow capacity, etc.) of fluid flowing through the fluid flow passages 218.

In the illustrated example, the first portion 502 of each of the fluid flow passages 218 includes an arcuate taper 518. In the illustrated example, the arcuate taper 518 extends from the first surface 412 to the throat 506. The arcuate taper 518 of each of the fluid flow passages 218 increases a pressure recovery produced by each of the fluid flow passages 218 by deterring and/or preventing fluid flowing through each of the fluid flow passages 218 from separating from an inner surface 520 of the first portion 502 of the fluid flow passages 218. A radius of curvature of the arcuate taper 518 and/or the first length 514 of the example first portion 502 increases the pressure recovery produced by each of the fluid flow passages 218 by reducing an amount of separation between fluid flowing through the fluid flow passages 218 and the inner surface 520 that may otherwise result from sharp edges of the fluid flow passages 218.

Further, the second portion 504 of each of the fluid flow passages 218 includes a linear taper 522. The linear taper 522 diverges from the throat 506 to the second surface 414, for example, at an angle of about between 2 degrees and 4 degrees. The linear taper 522 increases a pressure recovery produced by each of the fluid flow passages 218 by deterring and/or preventing fluid flowing through each of the fluid flow passages 218 from separating from an inner surface 524 of the second portion 504. The angle of tapering of the linear taper 522 and/or the length 516 of the example second portion 504 increases the pressure recovery produced by each of each of the fluid flow passages 218. Thus, the profile of each of the fluid flow passages 218 deters and/or prevents fluid from separating from the inner surfaces 520, 524 of the fluid flow passages 218 to increase a pressure recovery produced by each of the fluid flow passages 218.

Figure 6:
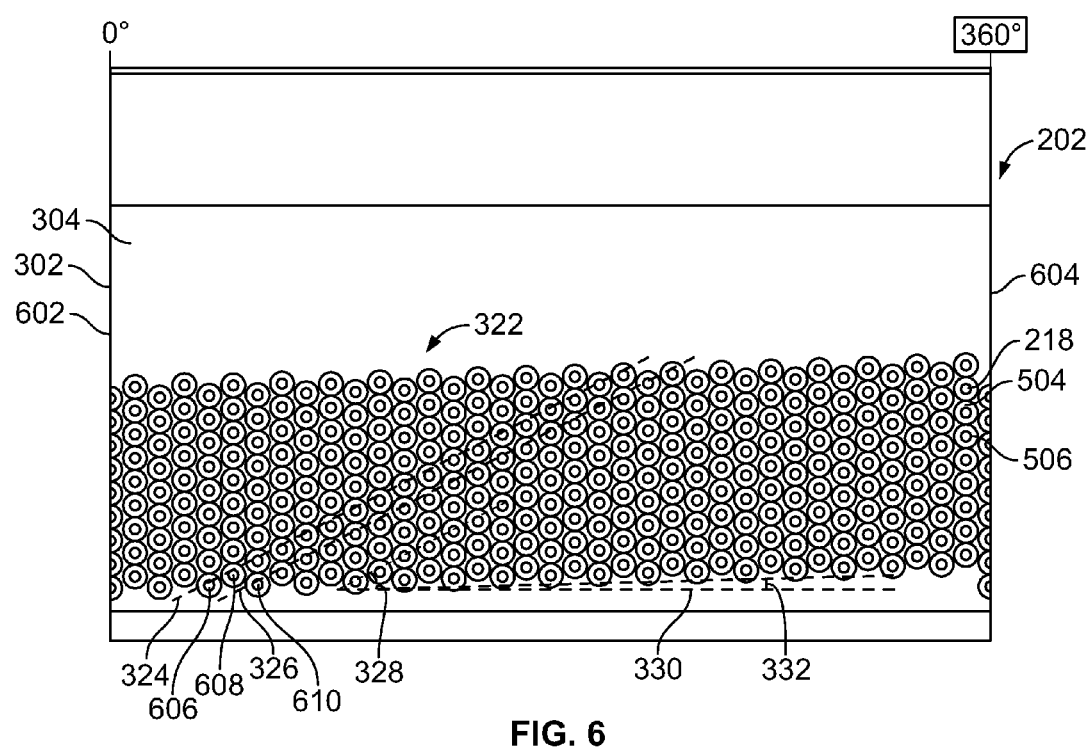
FIG. 6 shows a flat representation of a cylindrical surface of the valve cage of FIGS. 2 and 3.

FIG. 6 shows a representation of the example cylindrical valve cage 202 of FIGS. 2 and 3 cut along a line parallel to the axis 310 (FIG. 3) and unrolled to lie as a flat surface. More specifically, FIG. 6 illustrates a first end 602 (e.g., identified as located at 0 degrees in FIG. 6) and an opposing second end 604 (e.g., identified as located at 360 degrees in FIG. 6) that connect to form the cylindrical valve cage 202 of FIGS. 2 and 3. The representation shown in FIG. 6 further illustrates the positioning of the cluster 322 of the fluid flow passages 218 along the cage wall 302.

FIG. 6 illustrates the inner surface 304 of the cage body 302 and the cluster 322 of the fluid flow passages 218 defined by the cage body 302. Thus, the second portion 504 and the throat 506 of each of the respective fluid flow passages 218 are shown in FIG. 6. In the illustrated example, the cluster 322 of the fluid flow passages 218 as a whole is oriented to extend along a diagonal path (e.g., a helically-shaped path along a cylindrical surface) on the cage wall 302. That is, the cluster 322 as a whole extends diagonally along the cage wall 302 (e.g., upward and to the right in the illustrated example) relative to the axis 310 of the valve cage 202. For example, the path of the cluster 322 of the fluid flow passages 218 is defined by the angle 332 relative to the plane 330 perpendicular to the axis 310 of the valve cage 202.

Further, as illustrated in FIG. 6, the fluid flow passages 218 of the cluster 322 are positioned in rows on the cage wall 302. For example, the row 324 includes a fluid flow passage 606 (e.g., a first fluid flow passage) and another fluid flow passage 608 (e.g., a second fluid flow passage) adjacent the fluid flow passage 606, and the adjacent row 326 includes another fluid flow passage 610 (e.g., a third fluid flow passage) adjacent the fluid flow passages 606, 608 of the row 324. The rows (e.g., the rows 324, 326) of the fluid flow passages 218 are oriented to extend along a diagonal path (e.g., a helically-shaped path along a cylindrical surface) on the cage wall 302. For example, each of the rows (e.g., the rows 324, 326) of the fluid flow passages 218 extends diagonally along the cage wall 302 (e.g., upward and to the right in the illustrated example) relative to the axis 310 of the valve cage 202. For example, the diagonal path of each row of the cluster 322 of the fluid flow passages 218 is defined by the angle 328 relative to the plane 330 perpendicular to the axis 310 of the valve cage 202. In the illustrated example, the angle 332 that defines the orientation of the cluster 322 as a whole is less than the angle 328 that defines the orientation of each of the rows (e.g., the rows 324, 326) forming the cluster 322. The orientation of the cluster 322 as a whole and the orientation of the rows forming the cluster 322 cause the fluid flow passages 218 to be staggered on the cage wall 302 relative to the plane 330 and/or the axis 310. As disclosed in further detail below, the staggering of the fluid flow passages 218 enables the valve cage 202 to produce a linear and/or otherwise predictable change in flow capacity and/or a constant pressure recovery for fluid flow as the closure member 204 (FIG. 2) transitions between a closed position and an open position.

Figure 7:
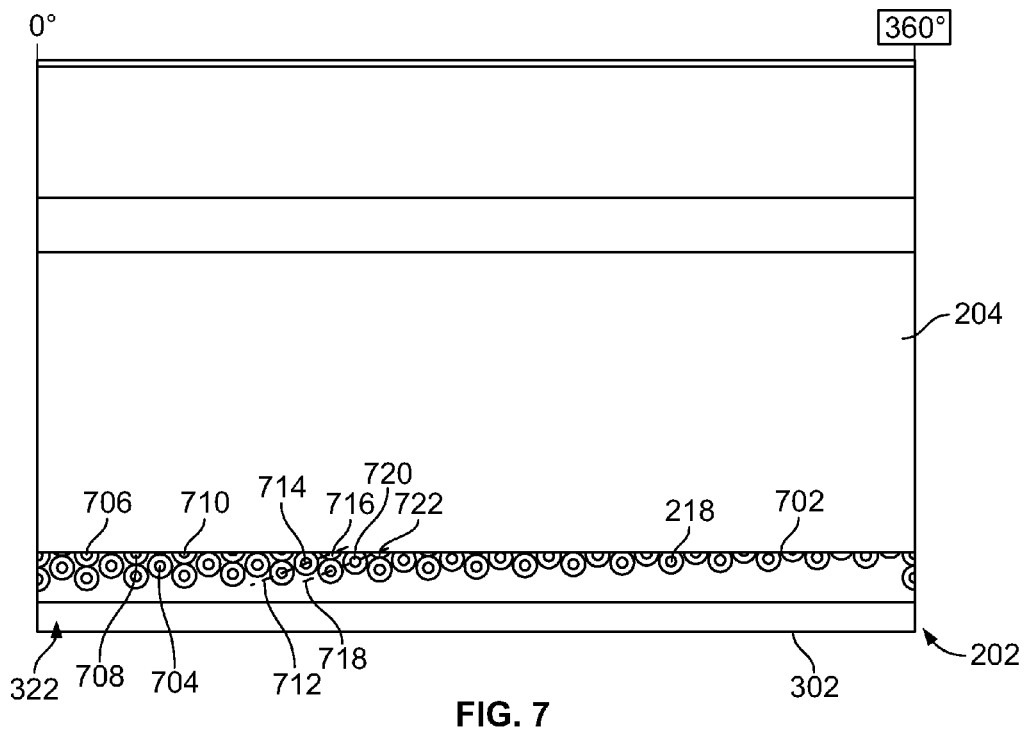
FIG. 7 depicts the valve cage surface of FIG. 6 and a flat representation of the closure member of FIG. 2 in a first partially-open position.
Figure 8:
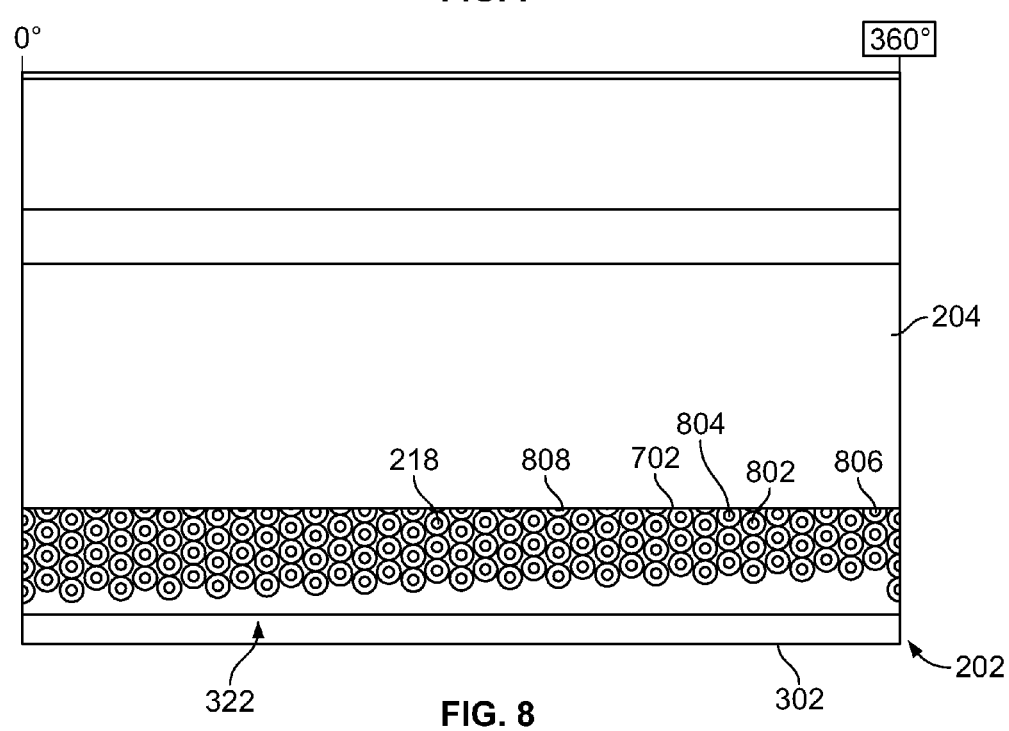
FIG. 8 depicts the valve cage surface of FIGS. 6 and 7 and the closure member of FIG. 2 in a second partially-open position.

FIGS. 7 and 8 show representations of the cylindrical closure member 204 (as illustrated in FIG. 2) positioned relative to the example cylindrical valve cage 202 (as illustrated in FIGS. 2 and 3) cut along a line parallel to the axis 310 (FIG. 3) and unrolled to lie as a flat surface. More specifically, FIG. 7 illustrates the closure member 204 at a first partially-open position and FIG. 8 illustrates the closure member 204 at a second partially-open position different than the first partially-open position. For example, the closure member 204 is in the first partially-open position of FIG. 7 shortly upon moving away from the closed position (FIG. 2) toward a fully-open position and is subsequently in the second partially-open position of FIG. 8 upon moving from the first partially-open position further toward the fully-open position. Likewise, the closure member 204 reaches the second partially-open position of FIG. 8 shortly after moving away from the fully-open position and subsequently reaches the first-partially open position upon continuing to move toward the closed position.

Turning to the first partially-open position of FIG. 7, the closure member 204 fully exposes a portion of the fluid flow passages 218 adjacent a surface 702 of the closure member 204 and partially exposes another portion of the fluid flow passages 218 adjacent the surface 702 as a result of the orientation of the fluid flow passages 218 on the cage wall 302. For example, a fluid flow passage 704 (e.g., a fourth fluid flow passage) adjacent the surface 702 of the closure member 204 is fully exposed, another fluid flow passage 706 (e.g., a fifth fluid flow passage) is partially exposed, another fluid flow passage 708 (e.g., a sixth fluid flow passage) is also partially exposed, and another fluid flow passage 710 (e.g., a seventh fluid flow passage) is also only partially exposed. Further, some rows of the fluid flow passages 218 include a plurality of the fluid flow passages 218 that are partially exposed by the closure member 204 in the first partially-open position. For example, a row 712 includes adjacent fluid flow passages 714, 716 (e.g., eighth and ninth fluid flow passages, respectively) that are partially exposed by the closure member 204, and an adjacent row 718 includes fluid flow passages 720, 722 (e.g., tenth and eleventh fluid flow passages, respectively) that are partially exposed by the closure member 204.

Similarly, in the second partially-open position illustrated of FIG. 8, the closure member 204 fully exposes a portion of the fluid flow passages 218 adjacent the surface 702 of the closure member 204 and partially exposes another portion of the fluid flow passages 218. For example, a fluid flow passage 802 (e.g., a twelfth fluid flow passage) adjacent the surface 702 of the closure member 204 is fully exposed, another fluid flow passage 804 (e.g., a thirteenth fluid flow passage) is partially exposed, another fluid flow passage 806 (e.g., a fourteenth fluid flow passage) is also partially exposed, and another fluid flow passage 808 (e.g., a fifteenth fluid flow passage) is also only partially exposed.

A degree of exposure of each of the fluid flow passages 218 affects the flow characteristics (e.g., pressure recovery, flow capacity, etc.) of the fluid flowing through those fluid flow passages 218. For example, at the first partially-open position of FIG. 7, the fully-exposed fluid flow passage 704 provides a greater flow capacity than the more than halfway partially-exposed second fluid flow passage 706, which provides a greater flow capacity than the about halfway exposed fluid flow passage 708, which provides a greater flow capacity than the less than halfway partially-exposed fluid flow passage 710. Likewise, at the second partially-open position of FIG. 8, the fully-exposed fluid flow passage 802 provides a greater flow capacity than the more than halfway partially-exposed second fluid flow passage 804, which provides a greater flow capacity than the about halfway exposed fluid flow passage 806, which provides a greater flow capacity than the less than halfway partially-exposed fluid flow passage 808. Additionally or alternatively, each of the fluid flow passages 704, 706, 708, 710 produces different respective pressure recoveries, and each of the fluid flow passages 802, 804, 806, 808 produces different respective pressure recoveries.

Further, as illustrated in FIGS. 7 and 8, the orientation of the cluster 322 of the fluid flow passages 218 on the cage wall 302 causes (1) a similar (e.g., substantially equal) number of the fluid flow passages 218 adjacent the closure member 204 to be fully exposed at each partially-open position of the closure member 204, (2) a similar (e.g., substantially equal) number of the fluid flow passages 218 to be more than halfway partially exposed at each partially-open position of the closure member 204, (3) a similar (e.g., substantially equal) number of the fluid flow passages 218 to be halfway exposed at each partially-open position of the closure member 204, and (4) a similar (e.g., substantially equal) number of the fluid flow passages 218 to be less than halfway partially exposed at each partially-open position of the closure member 204. For example, a similar number of the fluid flow passages 218 are about halfway exposed in the first partially-open position of FIG. 7 and the second partially-open position of FIG. 8.

Because each partially-open position of the valve cage 202 having a similar number of fully-exposed, more than halfway partially-exposed, halfway exposed, and/or less than halfway partially-exposed fluid flow passages 218, the valve cage 202 produces similar fluid characteristics (e.g., flow capacity, pressure recovery, etc.) at each position as the closure member 204 transitions between the closed position and the fully-open position. For example, each position of the closure member 204 increases and/or decreases the flow capacity produced by the valve cage 202 by a similar amount relative to the positions of the closure member 204 and, as a result, the valve cage 202 produces a linear rate of change of flow capacity as the closure member 204 transitions between the closed position and the open position. Additionally or alternatively, because the valve cage 202 produces a similar pressure recovery at each position of the closure member 204, the valve cage 202 produces a constant pressure recovery as the closure member 204 transitions between the closed position and the fully-open position. The linear rate of change of flow capacity and/or the constant pressure recovery produced by the valve cage 202 reduces a difficulty of positioning the control member 204 to control fluid flow of the valve 200 (FIG. 2). As a result, the example valve cage 202 disclosed herein reduces a need of a downstream flow meter to accurately control the fluid flow of the valve 200.

Although certain example apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. A valve cage, comprising:
   clustered fluid flow passages, each fluid flow passage having a first portion, a second portion, and a throat to couple the first portion and the second portion, the first portion defining an inlet and the second portion defining an outlet, the inlet having a first cross-sectional area and the outlet having a second cross-sectional area greater than the first cross-sectional area, the first portion having an arcuate tapered profile between the inlet and the throat, and the second portion having a linear tapered profile between the outlet and the throat, the clustered fluid flow passages include a first row and an adjacent second row, the first row and the second row being oriented at a first angle relative to a longitudinal axis of the valve cage, the first row and the second row extend in a helically-shaped pattern along the valve cage.

2. The valve cage of claim 1, wherein the throat has a third cross-sectional area smaller than the first cross-sectional area and the second cross-sectional area.

3. The valve cage of claim 1, wherein the first portion has a first length and the second portion has a second length greater than the first length.

4. The valve cage of claim 1, wherein the helically-shaped pattern of the clustered fluid flow passages produces at least one of a linear change in flow capacity or a constant pressure recovery of the valve cage as a valve plug moves relative the valve cage between an open position and a closed position.

5. The valve cage of claim 1, wherein the arcuate tapered profile of the first portion of each of the fluid flow passages provides a converging profile toward the throat to increase a pressure recovery produced by each of the fluid flow passages.

6. The valve cage of claim 1, wherein the linear tapered profile of the second portion of each of the fluid flow passages provides a diverging profile from the throat toward the outlet.

7. The valve cage of claim 6, wherein the linear tapered profile of the second portion has an angle of about between 2 and 4 degrees to increase a pressure recovery produced by each of the fluid flow passages.

8. The valve cage of claim 1, wherein a first fluid flow passage of the first row and a first fluid flow passage of the second row are laterally offset by a second angle relative to a lateral axis of the valve cage perpendicular to the longitudinal axis of the valve cage, the second angle being less than the first angle.

9. The valve cage of claim 8, further including a third row adjacent the second row and spaced from the first row such that the second row is positioned between the first row and the third row, wherein a first fluid flow passage of the third row is laterally offset relative to at least one of the first fluid flow passage of the first row or the first fluid flow passage of the second row at a distance defined by the second angle.

10. The valve cage of claim 9, further including a valve plug movable relative to the valve cage between a fully open position and a fully closed position, wherein at a first partially open position of the valve plug, the first fluid flow passage of the first row has a first exposed area and the first fluid flow passage of the second row has a second exposed area, the first exposed area is greater than the second exposed area.

11. The valve cage of claim 10, wherein the first fluid flow passage of the third row has a third exposed area less than the first exposed area and the second exposed area.

12. An apparatus, comprising:
a valve cage disposed between a bonnet and a valve seat, the valve cage having clustered fluid flow passages extending through a wall of the valve cage between a first surface and an opposing second surface, each of the clustered fluid flow passages including:
  a first portion having an arcuate tapered profile between an inlet formed on the first surface and a throat, the inlet provided at a first end of the arcuate tapered profile and the throat provided at a second end of the arcuate tapered profile such that the first portion has a first length defined by a radius of curvature of the arcuate tapered profile;
  a second portion having a linear tapered profile between the throat and an outlet formed on the second surface, the throat provided at a third end of the linear tapered profile, the second portion having a second length greater than the first length; and
  a first row and an adjacent second row that extend in a helical pattern along the wall of the valve cage at a first angle relative to a longitudinal axis of the valve cage.

13. The apparatus of claim 12, wherein the second portion diverges linearly from the throat to the second surface at an angle of about between 2 and 4 degrees.

14. The valve cage of claim 12, wherein a first fluid flow passage of the first row is laterally offset relative to an adjacent first fluid flow passage of the second row at a second angle relative to an axis perpendicular to the longitudinal axis, the first fluid flow passage of the first row to have a first exposed area and the first fluid flow passage of the second row to have a second exposed area when a valve plug is at a first open position relative to the valve cage, the valve cage having an opening defined by a wall to slidably receive the valve plug, the first exposed area being greater than the second exposed area.

15. The valve cage of claim 12, wherein a center of the radius of curvature lies on a plane coinciding with the throat.

16. The valve cage of claim 12, wherein a line tangent to the first end of the arcuate tapered profile defining the inlet is substantially perpendicular to a line tangent to the second end of the arcuate tapered profile adjacent the throat.

17. A valve cage, comprising:
a body having means for allowing fluid flow through the valve cage, the means for allowing fluid flow being helically arranged in adjacent rows along a length of the body relative to a longitudinal axis of the valve cage, the means for allowing fluid flow including means for increasing pressure recovery, the pressure recovery means including:
  a first portion having means for converging fluid flow, the means for converging having an arcuate tapered profile between an inlet of the means for allowing fluid flow and a throat of the means for allowing fluid flow, the first portion has a first end defining the inlet and a second end defining the throat; and
  a second portion coupled to the first portion, the second portion having means for diverging the converged fluid flow, the means for diverging having a linear tapered profile between the throat and an outlet of the means for allowing fluid flow, the second portion having a third end defining the throat and a fourth end defining the outlet.

18. The valve cage of claim 17, wherein the means for allowing fluid flow is to produce at least one of a linear change in flow capacity or a constant pressure recovery as a valve plug moves between an open position and a closed position relative to the valve cage.

19. The valve cage of claim 17, wherein the second end and the third end are to lie on a common plane.

* * * * *